(12) United States Patent
Niimi et al.

(10) Patent No.: US 6,417,588 B2
(45) Date of Patent: Jul. 9, 2002

(54) LEAD WIRE UNIT OF DC ROTARY ELECTRIC MACHINE

(75) Inventors: Masami Niimi, Handa; Yasuyuki Wakahara, Kariya; Masahiro Kato, Chiryu, all of (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 09/742,003

(22) Filed: Dec. 22, 2000

(30) Foreign Application Priority Data

Dec. 24, 1999 (JP) ............................................ 11-367573
Dec. 24, 1999 (JP) ............................................ 11-367580

(51) Int. Cl.[7] ................................................ H02K 7/10
(52) U.S. Cl. ........................................ 310/71; 310/249
(58) Field of Search .................. 310/71, 249; 174/65 R (56) References Cited

U.S. PATENT DOCUMENTS

| | | | | |
|---|---|---|---|---|
| 4,355,253 A | * | 10/1982 | Vollbrecht | 310/239 |
| 4,538,085 A | * | 8/1985 | Tanaka | 310/154.16 |
| 4,709,124 A | * | 11/1987 | Wheeler et al. | 174/65 R |
| 4,754,184 A | * | 6/1988 | Morikane et al. | 310/239 |
| 4,870,309 A | * | 9/1989 | Hosoya | 310/239 |
| 4,891,539 A | | 1/1990 | Okamoto et al. | 310/239 |
| 4,965,478 A | | 10/1990 | Kobayashi et al. | 310/249 |
| 4,985,654 A | * | 1/1991 | Morikane | 174/23 R |
| 5,099,163 A | * | 3/1992 | Zenmei | 310/239 |
| 5,414,318 A | * | 5/1995 | Shimizu et al. | 310/239 |
| 5,847,477 A | * | 12/1998 | Shiroyama et al. | 310/249 |

FOREIGN PATENT DOCUMENTS

| | | | |
|---|---|---|---|
| JP | 57-90356 | | 6/1982 |
| JP | 4-134151 | | 12/1992 |
| JP | 10-66311 A | * | 3/1998 |
| JP | 10-215542 | | 8/1998 |

* cited by examiner

Primary Examiner—Joseph Waks
(74) Attorney, Agent, or Firm—Oliff & Berridge, PLC (57) ABSTRACT

A lead wire unit of a DC rotary electric machine having a frame and a plurality of brushes is comprised of an outside power supply wire, one or more brush-lead wires, a metal joint and a grommet fixed to the frame. The metal joint has an outside surface to which the outside power supply wire is welded and an inside surface to which said brush lead wire are welded. The grommet has a hollow portion to which the metal joint is force-fitted and a holding portion for holding the outside power supply wire near the metal joint.

5 Claims, 6 Drawing Sheets

FIG. 18

LEAD WIRE UNIT OF DC ROTARY ELECTRIC MACHINE

CROSS REFERENCE TO RELATED APPLICATION

The present application is based on and claims priority from Japanese Patent Applications Hei 11-367573 filed Dec. 24, 1999 and Hei 11-367580 filed Dec. 24, 1999, the contents of which are incorporated herein by reference.

BACKGROUND OF THE INVENTION

1. Field of the Invention

The present invention relates to a lead wire unit of a DC rotary electric machine, such as a DC motor or a DC generator that has a plurality of brushes.

2. Description of the Related Art

U.S. Pat. No. 4,965,478 or the corresponding Japanese Patent Application JP-Y2-6-35649 discloses a DC motor having four brushes. In this motor, a pair of stranded brush lead wires, which supplies battery current to a pair of brushes, is bundled and inserted into a grommet. The grommet has a pipe-like protecting portion that covers the lead wires extending outward from a motor frame. The protecting portion protects a portion of the lead wires between the motor frame and a metal joint that is connected to an outside power source. The plurality of lead wires extends outward from the grommet and fixedly welded to the metal joint at the ends thereof.

Although the lead wires that are disposed inside the frame is protected from vibration of the motor, the lead wire outside the frame is not well protected. In other words, if the metal joint vibrates relative to the frame, or if the lead wire extending outward from the frame is vibrated, the portion of the lead wire welded to the metal joint may snap off. This is because the welded portion of the stranded lead wire is fixed to the metal joint while the middle portion thereof is frequently bent at the metal joint. Because portions of the lead wire around the welded portion are repeatedly bent, the lead wire may snap off due to a fatigue failure.

For example, a starter motor for starting a vehicle engine is exposed to such a vibration condition. When the engine starts, a magnet switch shakes much relative to the starter motor. Accordingly a lead wire extending outward from the starter motor to the magnet switch is shaken repeatedly.

JP-A-10-215542 discloses a lead wire unit, in which lead wires extend through a grommet to connect an outside power source and a pair of brushes disposed in a frame.

In the above publication, because the lead wires extend through the grommet, there are many longitudinal gaps between the lead wires and the grommet. Accordingly, water may get into the inside of the frame through the longitudinal gaps.

There was an idea of fusing a portion of the lead wires inserted into the grommet by a welder. However it is difficult to make the peripheral portion solid enough to eliminate such longitudinal gaps and to form a watertight seal in the grommet, because such portion may change in shape and in size. This makes it difficult to design the inside diameter of the grommet for force-fit or interference-fit with the lead wires.

There was another idea of the grommet having as long sleeve as possible to provide a watertight seal. However, this long sleeve cannot seal out water passing through the longitudinal gaps as far as the lead wires are stranded wires.

Thus it is not possible to provide watertight seal by such conventional structures.

SUMMARY OF THE INVENTION

It is a main object of the invention to provide a lead wire unit of a rotary electric machine in which an outwardly extending lead wire is prevented from snapping off due to vibration.

According to a first feature of the invention is a lead wire unit that includes an outside power supply wire, an inside brush lead wire, and a metal joint. The power supply wire extends outward from the frame. The brush lead wire extends inside the frame and connected to a brush unit disposed inside the frame. The metal joint has terminals to which the power supply wire and the brush lead wire are welded. The grommet has a hollow portion and a holding portion. The metal joint is force-fitted to the hollow portion, and the holding portion holds a portion of the power supply wire near the metal joint.

Because the holding portion of the grommet holds the portion of the lead wire near the welded portion, the lead wire can be prevented from being bent repeatedly. As a result, the power supply wire is prevented from snapping off near the metal joint.

In addition, the power supply wire and brush lead wire are not inserted into the grommet but the metal joint is securely fitted into the through hole of the grommet. Different from a bundle of stranded lead wires, the metal joint has no longitudinal gaps or through holes therein. The metal joint has an outside terminal portion, an inside terminal portion and a portion that is force-fitted or interference-fitted to a hollow portion of the grommet. Therefore, the grommet provides a watertight seal even if the power supply wire and brush lead wire are formed of a large number of stranded wires having a plurality of longitudinal gaps. As a result, the DC rotary electric machine provides a highly watertight seal at the portion from which the lead wire extends outward.

According to a second feature of the invention, one of the grommet and the metal joint has a projection strip in close contact with the other under pressure to separate the power supply wire from the brush lead wire. Therefore, the inside space is water-tightly sealed from the outside space.

Another object of the invention is to provide a lead wire unit of a DC rotary electric machine that has a watertight seal at a portion from which lead wires extend outwardly.

According to a third feature of the invention, a lead wire unit includes outside power supply wire, a brush-lead wire connected to a brush unit, and a metal joint disposed between the outside power supply wire and the brush lead wire. The metal joint has an outside terminal to which the power supply wire is connected and an inside terminal to which the brush lead wire is connected at a portion spaced apart from the outside terminal, and is force-fitted to a hollow portion of the grommet.

In other words, neither the power supply wire nor the brush lead wire extends through the grommet, and only the metal joint is fitted in the grommet. The metal joint is a solid conductive member having no longitudinal gaps, and at least a peripheral portion of the metal joint is force-fitted to a hollow portion of the grommet between the outer terminal and the inner terminal of the metal joint. Therefore, even if the power supply wire and the brush lead wire are formed of stranded wires, the lead wire unit provides an excellent watertight seal.

In addition, the lead wire can be extended outwardly in a desired direction from the grommet by using a metal joint. Accordingly, it is very easy to connect the lead wires to an outside power source.

According to a fourth feature of the invention, the metal joint is formed of a T-shaped plate member having a longitudinal portion whose edge has the outside terminal and a lateral portion whose edge has the inside terminal.

Therefore, the longitudinal portion can be force-fitted into a through hole of the grommet so that excellent watertight seal can be provided between the metal joint and the grommet.

The lateral portion is much wider than the longitudinal portion. The lateral portion holds the metal joint at the circumferential portion of the grommet and prevents the metal joint from falling out of the grommet under a strong pull. In addition, the lateral portion can have a plurality of the inside terminals, which make connection work easier. The metal joint is a plate member, which is easy to manufacture at a low cost and easy to connect the outside power supply lead wire and the brush lead wires by welding.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A lead wire arrangement of a DC rotary electric machine having two pair of brushes according to a first embodiment of the invention is described with reference to FIGS. 1–5. Lead wire unit 10 extends from the outside of end frame 6 into the inside thereof and is connected to a pair of brushes 5 that is disposed inside frame 6. Rubber grommet 1 is fixed to frame 6. Grommet 1 holds lead wire unit 10 and insulate the same from frame 6. Lead wire unit 10 includes power supply wire 3 extending outward from end frame 6, a pair of brush lead wires 2 extending inward from frame 6 to a pair of positive-side brushes and metal joint 4. Power supply wire 3 and the pair of brush lead wires 2 are welded to metal joint 4. In the meanwhile, a pair of negative-side brushes, which is not shown, is grounded inside frame 6.

Power supply wire 3 is a stranded copper wire. Power supply wire 3 has terminal portion 31 at one end thereof, which is welded to outside terminal 41 of metal joint 4. Power supply wire 3 has a ring-shaped terminal portion at the other end thereof, which is connected to a magnet switch (not shown). Terminal portion 31 has a rectangular parallelepiped shape, which is formed by an electric welder so as to be readily connected to metal joint 4 by a spot welder. Therefore, terminal portion 31 includes a transitional state portion 33, which has a transitional state changing from a state of a bundle of wires to a solid state.

Each of brush lead wires 2 is also a stranded wire and has terminal portion 21, which is welded to one of inside terminals 42 of metal joint 4. Terminal portion 21 is also formed into a rectangular parallelepiped shape by an electric welder in the same manner as described above.

Metal joint 4 is a flat and solid rectangular parallelepiped copper member. Metal joint 4 has an outside terminal 41 and a pair of inside terminals 42 connected to the pair of brush lead wires 2. Outside terminal 41 is disposed at the middle of the outside surface of metal joint 4, and terminal portion 31 of power supply wire 3 is spot-welded to outside terminal 41. The pair of inside terminals 42 is disposed at opposite sides of the inside surface of metal joint 4 spaced apart from outside terminal 41. The pair of brush lead wires 2 is respectively spot-welded to the pair of inside terminals 42.

Each of terminal portions 21 and 31 is inserted between a pair of electrodes of an electric welder and fused under pressure to provide a solid and smooth peripheral surface. Accordingly, any of the stranded wires may not fall off while terminal portions 21 and 31 are spot-welded to inside and outside terminals 42 and 41 of metal joint 4.

Figure 1:
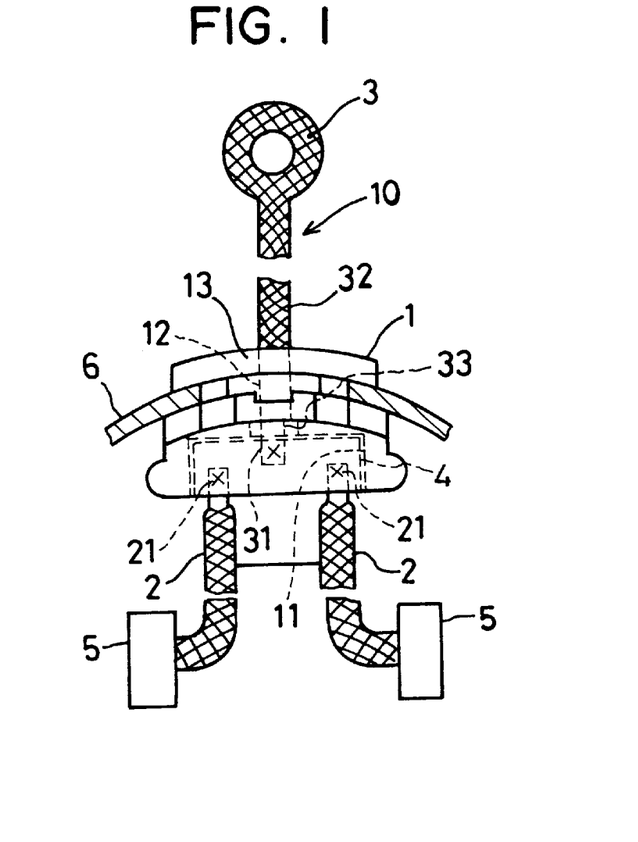
FIG. 1 is a front view of a lead wire unit of a DC rotary electric machine according to a first embodiment of the invention.
Figure 2:
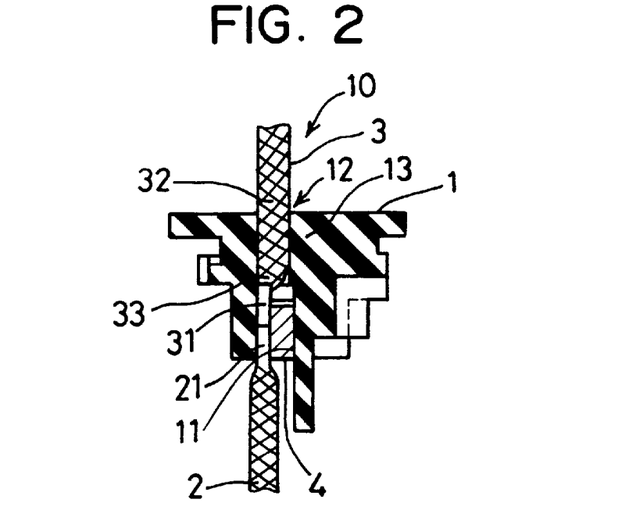
FIG. 2 is a side view of the lead wire unit according to the first embodiment of the invention.
Figure 3:
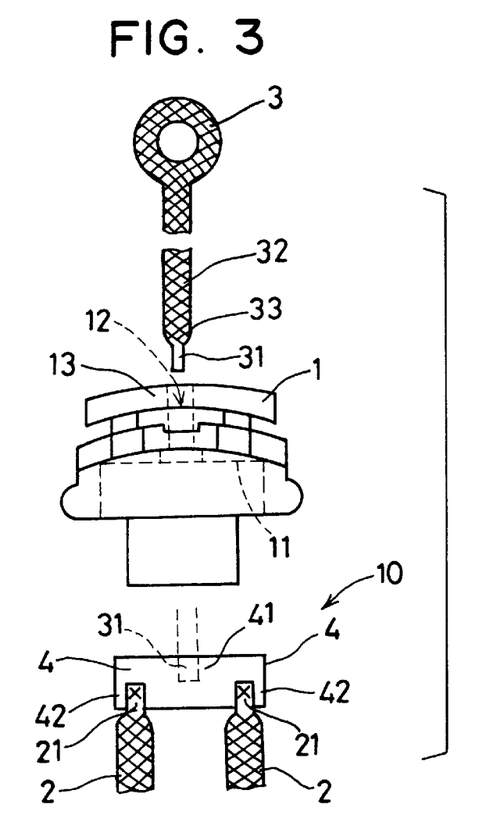
FIG. 3 is an exploded front view of the lead wire unit according to the first embodiment.
Figure 4:
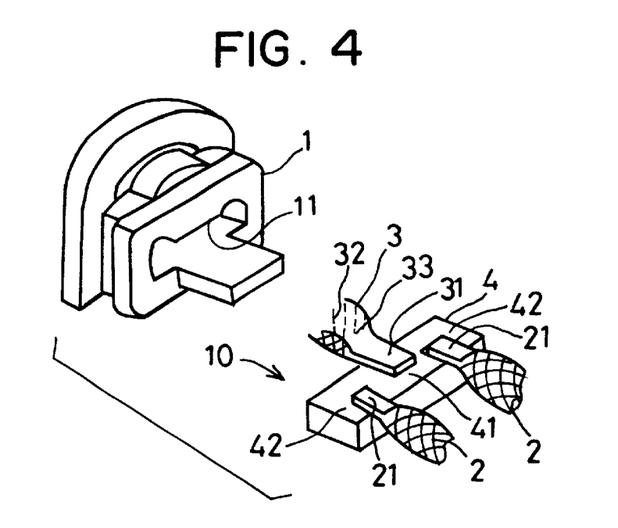
FIG. 4 is an exploded perspective view of the lead wire unit according to the first embodiment.
Figure 5:
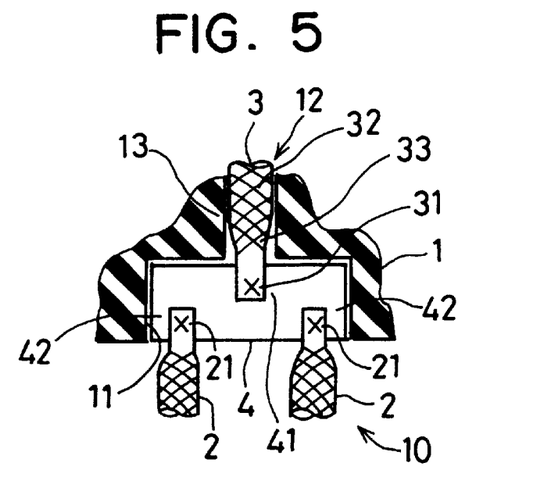
FIG. 5 is a cross-sectional front view of a main portion of the lead wire unit according to the first embodiment.

Metal joint 4 is force-fitted or interference-fitted to hollow portion 11 of grommet 1 at a portion thereof between outside terminal 41 and inside terminal 42. Thus, metal joint 4 is not only held in hollow portion 11 of rubber grommet 1 but also water-tightly press-contacted by the inner periphery of hollow portion 11.

Terminal portions 21 of brush lead wires 2 and terminal portion 31 of power supply wire 3 are welded to metal joint 4, which is held in hollow portion 11 of rubber grommet 1 by its elasticity. In other words, terminals 21 and 31 are biased by the elasticity of rubber grommet 1 to closely contact metal joint 4.

Furthermore, stranded wire's portion 32 near the terminal portion 31 that is welded to metal joint 4 is slightly force-fitted to through hole 12 of holding portion 13 of grommet 1. Therefore, transitional state portion 33 disposed between stranded portion 32 and terminal portion 31 is protected from bending force. Grommet 1 is made of heat resistive rubber such as nitril rubber or acrylic rubber.

In assembling, firstly, power supply wire 3 is inserted from the outside of grommet 1 into through hole 12 so that a suitable length thereof extends from the inside of grommet 1. Although the cross-sectional area of the stranded wire is slightly larger than the cross-sectional area of the through hole 12 before insertion, through hole 12 elastically expands as power supply wire 3 is inserted because of elastic rubber.

Then, terminal portions 21 of the pair of brush lead wires 2 and terminal portion 31 of power supply wire 3 are respectively spot-welded to the pair of inside terminals 42 and outside terminal 42 of metal joint 4. Thus, brush lead wires 2, power supply wire 3 and metal joint 4, together, form unitary lead wire unit 10.

Finally, metal joint 4 is brought into the inside of grommet by power supply wire 3 being pulled outward from grommet 1. Thus, metal joint 4 is held at a prescribed position of grommet 1. Stranded wire portion 32 of power supply wire 3 is fitted to through hole 12 under a small pressure, and metal joint 4 is accommodated in hollow portion 11 of grommet 1.

Thus, the wire assembling is completed, and grommet 1 together with lead wire unit 10 is fixed to rear frame 11.

As a result, grommet 1 is water-tightly sealed by metal joint 4 although power supply wire 3 and the pair of brush lead wires 2 have stranded wire portions. Even if any welded portion peels off, terminal portion 21 is held by grommet 1, thereby, to prevent short-circuiting inside frame 6.

Transitional portion 33, which is the weakest under the bending force, is protected from bending force.

Figure 6:
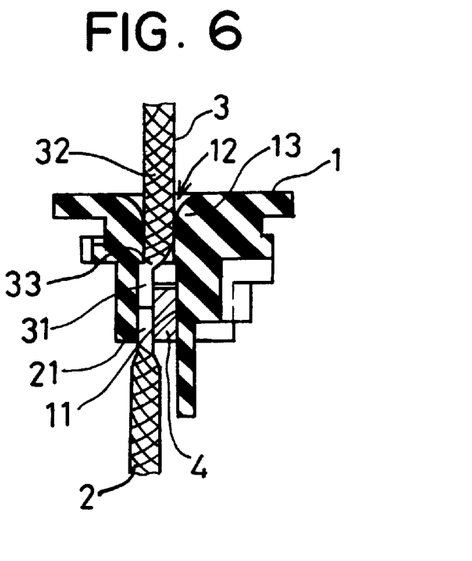
FIG. 6 is a cross-sectional side view of a main portion of a variation of the lead wire unit according to the first embodiment.

As shown in FIG. 6, the mouth of through hole 12 can be chamfered, so that power supply wire 3 can be prevented from bending acutely.

Figure 7:
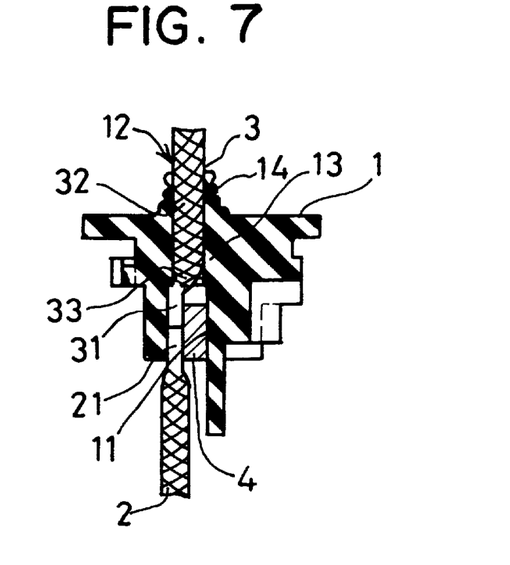
FIG. 7 is a cross-sectional side view of a main portion of a variation of the lead wire unit according to the first embodiment.

As shown in FIG. 7, sleeve portion 14 projects from holding portion 13 of grommet 1. Sleeve 14 is a tapered member that has thicker base portion and bellows on the outside surface. Because through hole 12 opens at the edge of sleeve 14, bending force is prevented from concentrating at a limited portion of power supply wire 3. Therefore, power supply wire 3 bends gently and may not snap off. Moreover, since sleeve 14 projects longitudinally, water can be shut out. Sleeve 14 can be extended near the end of power supply wire.

A lead wire unit of a DC rotary electric machine according to a second embodiment is described with reference to FIGS. 8–12.

Figure 8:
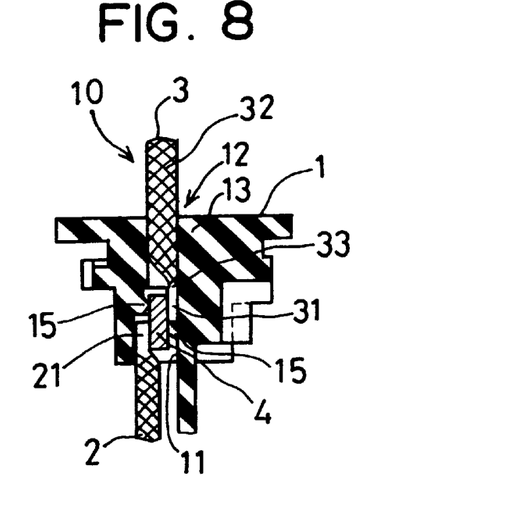
FIG. 8 is a cross-sectional side view of a main portion of a lead wire according to a second embodiment of the invention.
Figure 9:
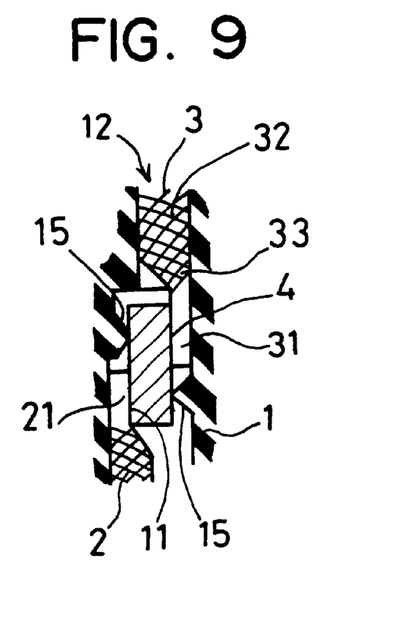
FIG. 9 is an enlarged view of the main portion shown in FIG. 8.
Figure 10:
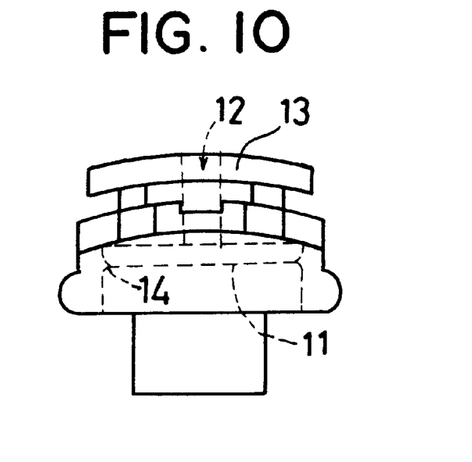
FIG. 10 is a front view of the grommet of the lead wire unit according to the second embodiment.
Figure 11:
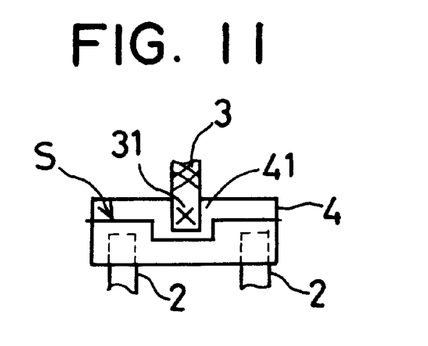
FIG. 11 is a front view of a seal structure formed on a metal joint of the lead wire unit according to the second embodiment.
Figure 12:
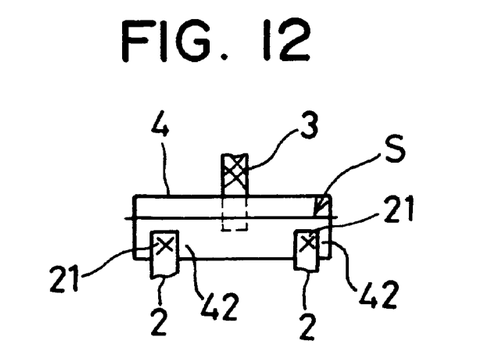
FIG. 12 is a rear view of the seal structure of the lead wire unit shown in FIG. 11.

As shown in FIGS. 8 and 9, grommet 1 has projection strip 15, which is in contact with metal joint 4 under pressure to divide hollow portion 11 into the space for power supply wire 3 and the space for brush lead wires 2. Terminal portion 31 is welded to a surface of metal joint 4, and a pair of terminal portions 21 of brush lead wire 2 is welded to the other surface of metal joint so that projection strip 25 can contact the smooth surface of metal joint 4.

Projection strip 15 is formed on the inner periphery of hollow portion 11 to surround metal joint 4 and has a triangular cross-section, as shown in FIG. 9. Projection strip 15 contacts metal joint 4 at the ridge thereof under a certain pressure sufficient to provide a watertight seal or barrier.

Projection strip 15 can be formed on the surface of metal joint 4.

It is possible to provide double, triple or more projection strips on the inner periphery of grommet 1 or the surface of metal joint 4. This can provide grommet 1 with a more watertight barrier.

A lead wire unit of a DC rotary electric machine according to a third embodiment of the invention is described with reference to FIGS. 13–16.

Lead wire unit 10 includes power supply wire 3, a pair of brush lead wires 2 connected to a pair of brushes 5 and metal joint 4.

Power supply wire 3 is a stranded wire formed of a plurality of copper wires, which has an end welded to outside terminal 41 of metal joint 4 and the other ring-shaped end that is connected to a terminal of a main switch. The pair of brush lead wires 2 is also stranded wires formed of a plurality of copper wires. Each of the pair of brushes has an end welded to one of a pair of inside terminals 42 and the other end connected to one of the pair of positive-side brushes 5.

Figure 13:
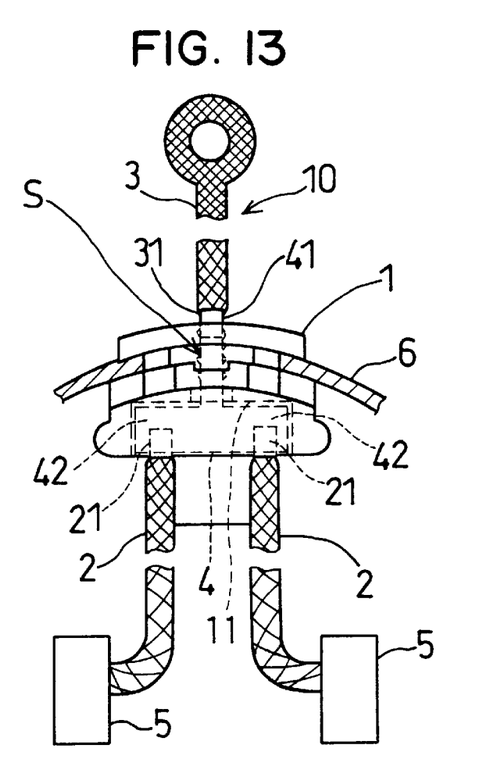
FIG. 13 is a front view of a main portion of a lead wire unit according to a third embodiment of the invention.
Figure 14:
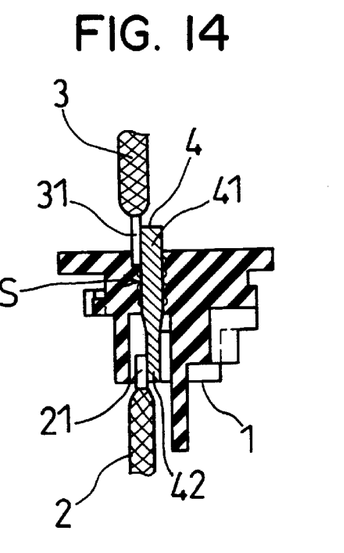
FIG. 14 is a cross-sectional side view of the main portion of the lead wire unit according to the third embodiment.
Figure 16:
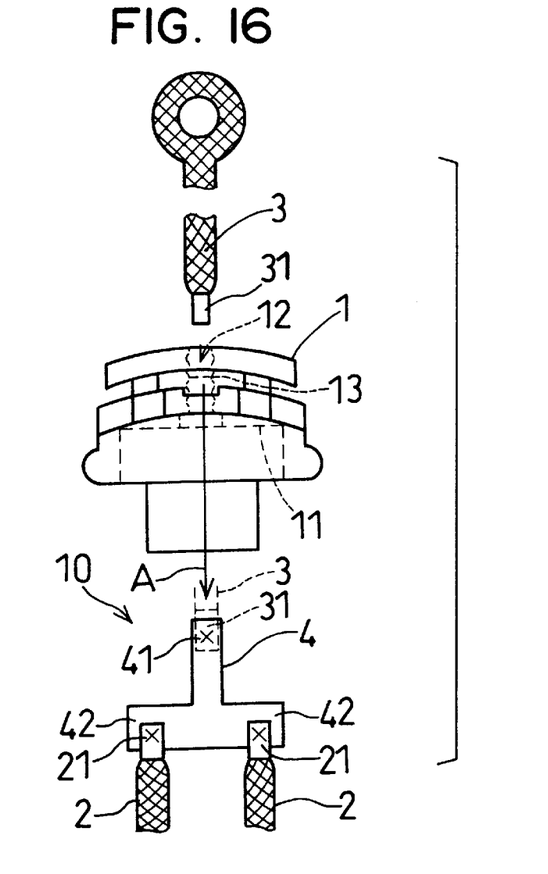
FIG. 16 is an exploded view of the lead wire unit according to the third embodiment.

Metal joint 4 is a T-shaped solid plate member, which has outside terminal 41 connected to power supply wire 3 and inside terminals 42 respectively connected to brush lead wires 2. In other words, the longitudinal portion of the T-shaped member has outside terminal 41 at an end thereof, and end 31 of power supply wire 3 is spot-welded to outside terminal 41. On the other hand, the lateral portion has inside terminals 42 at opposite ends thereof, and brush lead wires 2 are respectively spot-welded to inside terminals 42. The lateral portion of metal joint 4 is press-formed to be thinner than the longitudinal portion. The longitudinal portion has a smaller width and a larger cross-sectional area than the lateral portion. Each of terminal portions 21 and 31 is inserted between electrodes of a welder and fused thereby so that ends of the stranded wires are prevented from becoming loose when they are cut before the spot welding. The outer periphery of the terminal portions 21 and 31 are pressed by the electrodes to become smooth.

Metal joint 4 is securely force-fitted into grommet 1 between outside terminal 41 and inside terminal 42. In other words, the longitudinal portion is inserted into through hole 12 of grommet 1 and tightly sealed by a plurality of projecting strips 13. Therefore, the portion between grommet 1 and metal joint 4 forms a watertight seal S.

Figure 15:
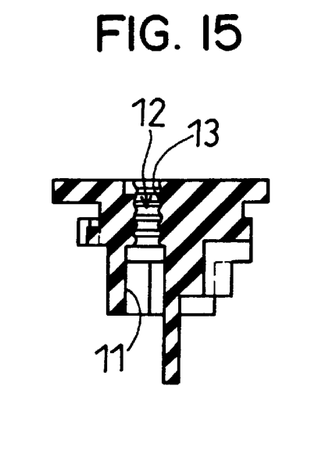
FIG. 15 is a cross-sectional side view of a grommet of the lead wire according to the third embodiment.

As shown in FIG. 15, grommet 1 has a plurality of projecting strips 13 formed on the inner periphery of through hole 12 that metal joint 4 contacts. The plurality of projecting strips 13 is formed between the outside open end or mouth of through hole 12 and inside open end or mouth thereof. The longitudinal portion is force-fitted into through hole 12 at the intermediate portion thereof and pressed by a plurality of ring-shaped projecting strips.

Terminal portion 31 contacts the outside mouth of through hole 12 of grommet 1 at the edge thereof. Therefore, metal joint 4 is prevented from falling out of grommet 1 into the inside of end frame 6. Because the lateral portion of metal joint 4 is disposed in grommet 1, metal joint 4 is prevented from falling out of grommet 1. Thus, once assembled, metal joint 4 is securely held by grommet 1.

Power supply wire 3 is inserted from the outside of grommet into through hole 12 in the same manner as described above.

As described above, metal joint 4 is a solid T-shaped plate member that has a longitudinally extending portion inserted into through hole 12 and a smooth outer surface. Grommet 1 has a plurality of projecting strips 13 on the inner periphery thereof. The plurality of projecting strips 13 contacts the outer periphery of the longitudinal portion of metal joint 4 under a certain pressure to provide a tight seal between trough hole 12 and the longitudinal portion of metal joint 4. Because projection strips 13 are flexible, it is easy to insert metal joint 4 into grommet 1 even if the interference margin of projection strips 13 is large enough for sealing.

In addition, it is easy to insert lead wire unit 10 into grommet 1. Because metal joint 4 is securely held by grommet 1, lead wire 1 can be properly held by grommet 1.

Even if the starter is splashed with water, the starter motor having lead wire unit 10 is protected from water. While lead wire unit 10 and grommet 1 are easy to assemble, they are not easily disassembled.

Figure 17:
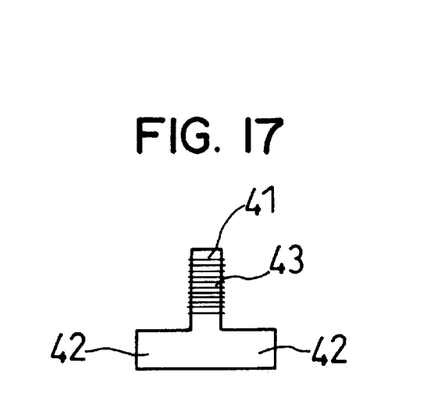
FIG. 17 is a front view of a metal joint of a variation of the third embodiment.
Figure 18:
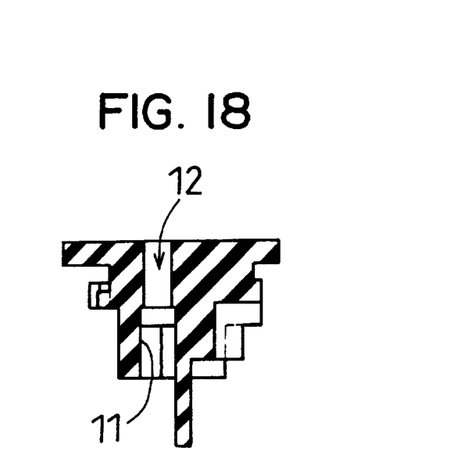
FIG. 18 is a cross-sectional side view of a grommet according to the variation of the third embodiment.

As shown in FIGS. 17 and 18, a plurality of projection strips 43 is formed on the outer periphery of metal joint 4' instead of projection strips 13 on the inner periphery of through hole 12 of grommet 1'. The plurality of projection strips 43 can be easily formed by a knurled tool, which is pressed on the longitudinal portion of metal joint 4'. The plurality of projection strips 43 can be also formed by a press die having such a knurled surface when metal joint 4' is press-formed.

Power supply wire 3 can be extended obliquely from grommet 1 to easily connect to an outside power source.

It is necessary to wide open through hole 12 when metal joint 4, which has outside terminal 41 welded to terminal portion 31 of power supply wire 3, is force-fitted to through hole 12. It is not so hard to do since rubber grommet 1 has a sufficient elasticity.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. A lead wire unit of a DC rotary electric machine having a frame and a plurality of brushes, said lead wire unit comprising:

an outside power supply wire extending outward from said frame;

a brush lead wire extending inward from said frame and being connected to one of said plurality of brushes, a metal joint having an outside surface to which said outside power supply wire is welded and an inside surface to which said brush lead wire is welded, and a grommet fixed to said frame for insulating said power supply wire and said brush lead wire from said frame and fixing said lead wire to said frame, said grommet having a hollow portion to which said metal joint is force-fitted and a holding portion for holding a portion of said outside power supply wire near said metal joint.

2. The lead wire unit as claimed in claim 1, wherein one of said grommet and said metal joint has a projection strip being in close contact with the other under a pressure to partition said hollow portion into an outside space for said outside power supply wire and an inside space of said brush lead wire.

3. A lead wire unit of a DC rotary electric machine having a frame and a plurality of brushes, said lead wire unit comprising:

an outside power supply wire extending outward from said frame;

a brush lead wire extending inward from said frame and being connected to said plurality of brushes;

a metal joint having an outside terminal to which said outside power supply wire is connected and an inside terminal to which said brush lead wire is connected at a portion spaced apart from said outside terminal, and a grommet fixed to said frame for insulating said power supply wire and said brush lead wire from said frame and fixing said lead wire to said frame, said grommet having a hollow portion to which said metal joint is force-fitted and a holding portion for holding said outside power supply wire near said metal joint.

4. The lead wire unit as claimed in claim 3, wherein said metal joint comprises a T-shaped plate member having a longitudinal portion whose edge has said outside terminal and a lateral portion whose edge has said inside terminal.

5. The rotary electric machine as claimed in claim 3, wherein said grommet further has a through hole, one of said grommet and said metal joint has at least a ring-shaped projection strip disposed at a portion between said grommet and said metal joint in contact with each other, and said projection strip is disposed at a portion between an outer mouth and inner mouth of said through hole.

* * * * *